(12) United States Patent
Basir et al.

(10) Patent No.: US 9,092,919 B2
(45) Date of Patent: Jul. 28, 2015

(54) WEB PORTAL SYSTEM FOR MANAGING VEHICLE USAGE AND MOBILITY

(75) Inventors: Otman A. Basir, Waterloo (CA); William Ben Miners, Guelph (CA); Hani Hawari, Waterloo (CA); Frank Friesacher, Ottawa (CA)

(73) Assignee: Intelligent Mechatronic Systems Inc., Waterloo, Ontario (CA)

(*) Notice: Subject to any disclaimer, the term of this patent is extended or adjusted under 35 U.S.C. 154(b) by 792 days.

(21) Appl. No.: 12/914,047

(22) Filed: Oct. 28, 2010

(65) Prior Publication Data

US 2011/0307119 A1 Dec. 15, 2011

Related U.S. Application Data

(60) Provisional application No. 61/255,646, filed on Oct. 28, 2009.

(51) Int. Cl.
G06F 17/00 (2006.01)
G07C 5/00 (2006.01)
G06Q 30/02 (2012.01)

(52) U.S. Cl.
CPC ............... *G07C 5/008* (2013.01); *G06Q 30/02* (2013.01)

(58) Field of Classification Search
CPC ....... Y04S 20/46; Y04S 20/325; G07C 5/008; G07C 5/006; G07C 5/0808; G07C 5/0816; G07C 5/0841
USPC ............................................................ 701/1
See application file for complete search history.

(56) References Cited

U.S. PATENT DOCUMENTS

| | | | |
|---|---|---|---|
| 6,092,021 A | 7/2000 | Ehlbeck et al. | |
| 6,260,064 B1 | 7/2001 | Kurzrok | |
| 6,594,579 B1 * | 7/2003 | Lowrey et al. | ................ 701/123 |
| 6,868,386 B1 | 3/2005 | Henderson et al. | |
| 6,871,139 B2 | 3/2005 | Liu et al. | |
| 6,888,448 B2 | 5/2005 | Sandberg et al. | |
| 7,024,306 B2 | 4/2006 | Minami et al. | |
| 7,181,227 B2 | 2/2007 | Wilson et al. | |
| 7,236,799 B2 | 6/2007 | Wilson et al. | |
| 7,237,203 B1 | 6/2007 | Kuenzner | |
| 7,274,987 B2 | 9/2007 | Ishiguro | |
| 7,487,036 B2 | 2/2009 | Kim | |
| 7,489,235 B2 | 2/2009 | Maesono et al. | |
| 7,542,915 B2 | 6/2009 | Kendrick | |
| 7,660,725 B2 | 2/2010 | Wahlbin et al. | |
| 7,741,968 B1 | 6/2010 | Tannenbaum et al. | |
| 2002/0143693 A1 | 10/2002 | Soestbergen et al. | |

(Continued)

FOREIGN PATENT DOCUMENTS

| | | |
|---|---|---|
| JP | 2010-9393 | 1/2010 |
| WO | 2010/014620 A2 | 2/2010 |
| WO | 2010/065522 A1 | 6/2010 |

*Primary Examiner* — John Q Nguyen
*Assistant Examiner* — Kyung Kim
(74) *Attorney, Agent, or Firm* — Carlson, Gaskey & Olds, P.C.

(57) ABSTRACT

A network including a web portal gathers, compiles and formats information on vehicle usage across a vehicle community. The vehicle community is comprised of a plurality of vehicles whose users and owners have joined the network and communicate through the web portal to allow gathering and accumulation of vehicle operation information for various uses including maintaining a record of vehicle operation and determining energy usage and environmental impact.

15 Claims, 5 Drawing Sheets

(56) References Cited

U.S. PATENT DOCUMENTS

| | | |
|---|---|---|
| 2005/0065678 A1 | 3/2005 | Smith et al. |
| 2005/0234772 A1 | 10/2005 | Haruki et al. |
| 2006/0155574 A1 | 7/2006 | Van Den Bossche |
| 2007/0027726 A1 | 2/2007 | Warren et al. |
| 2007/0093947 A1* | 4/2007 | Gould et al. .................. 701/29 |
| 2007/0200713 A1 | 8/2007 | Weber et al. |
| 2007/0281689 A1 | 12/2007 | Altman et al. |
| 2007/0288270 A1 | 12/2007 | Gay et al. |
| 2007/0299700 A1 | 12/2007 | Gay et al. |
| 2008/0015975 A1 | 1/2008 | Ivchenko et al. |
| 2008/0036653 A1 | 2/2008 | Huston |
| 2008/0045245 A1 | 2/2008 | Billmaier et al. |
| 2008/0046326 A1 | 2/2008 | Horstemeyer |
| 2008/0070593 A1 | 3/2008 | Altman et al. |
| 2009/0233629 A1 | 9/2009 | Jayanthi |
| 2009/0235176 A1 | 9/2009 | Jayanthi |
| 2009/0292617 A1 | 11/2009 | Sperling et al. |

\* cited by examiner

My Carbon Footprint 7.56 tonnes *

* Annual projection
based on data
accumulated to date

_52

| ENVIRONMENTAL IMPACT DETAILS | Selected Period | My History | All Driver * |
|---|---|---|---|
| Fuel Consumption (gallons) | 46.78 | 270.3 | N/A |
| Fuel Efficiency (miles per gallon) | 26.8 | 30.29 | 36.2 |
| $CO_2$ Production (tons) | 907.53 | 5243.82 | N/A |
| CO2 per Mile (pound/mile) | 0.72 | 0.64 | 0.54 |
| Fuel Consumption per Trip (gallons) | 0.69 | 0.61 | 0.33 |

WEB PORTAL SYSTEM FOR MANAGING VEHICLE USAGE AND MOBILITY

CROSS REFERENCE TO RELATED APPLICATION

This application claims priority to U.S. Provisional Application No. 61/255,646 which was filed on Oct. 28, 2009.

BACKGROUND

This disclosure generally relates to system and method of communicating information pertaining to vehicle use and position. More particularly, this disclosure relates to a system and method for real time monitoring of vehicle use and operation.

A vehicle on board diagnostics interface provides the capability of monitoring real time vehicle operation. A telematic device provides for communication of vehicle information over a wireless communication network. The telematic device may be connected to the on board diagnostics interface or can be connected in a different manner to receive information gathered regarding vehicle operation and position. The telematic device may transmit information obtained from the vehicle to a remotely located computer through the wireless network. The data may be utilized to characterize vehicle and driver performance along with providing location information on the vehicle.

SUMMARY

An example disclosed system and web portal gathers, compiles and formats information on vehicle usage across a vehicle community. The vehicle community is comprised of a plurality of vehicles whose users and owners have joined the network and communicate through the web portal to allow gathering and accumulation of vehicle operation information for various uses including maintaining a record of vehicle operation so that routine maintenance can be timely done. The example system and web portal provides for real time monitoring of vehicle usage and position that may be utilized by individuals in tracking vehicle location. The example system and web portal further provides a central location for determining energy usage and the resulting impact on the environment to provide a measure for possible improvements and conservation.

These and other features disclosed herein can be best understood from the following specification and drawings, the following of which is a brief description.

DETAILED DESCRIPTION

Figure 1:
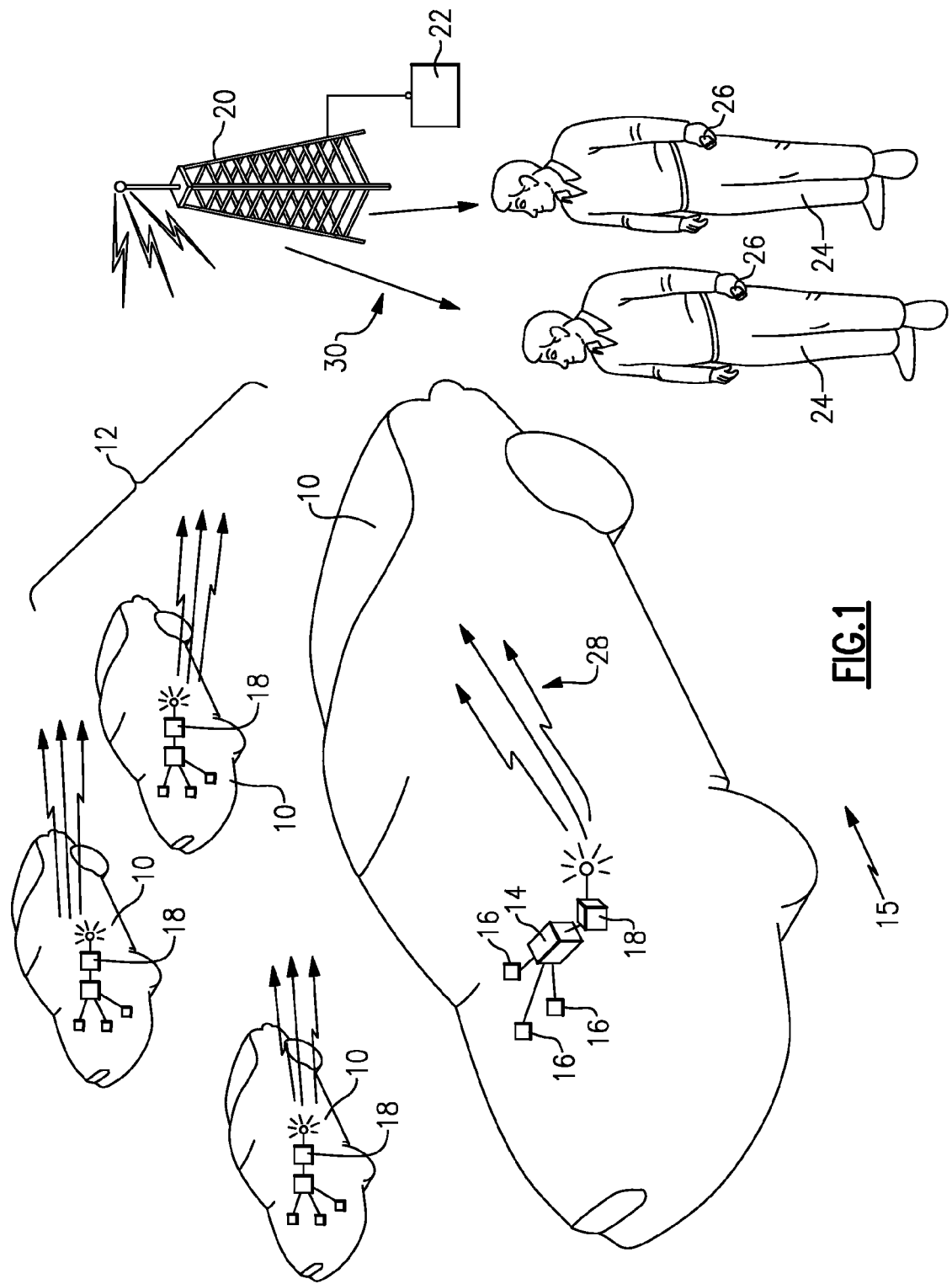
FIG. 1 is a schematic view of an example system for managing vehicle usage.

Referring to FIG. 1, a system for managing multiple vehicle's usage and monitoring multiple vehicles is schematically indicated at 15 and includes a plurality of vehicles 12 with each vehicle 10 including a telematic device 18 that transmits information 28 through a wide open network 20 to a web portal 22 and through a plurality of users 24. The example system 15 provides for the communication of vehicle usage and mobility data to multiple users 24 for monitoring vehicle use of other vehicles 10 also within the network 15.

Each user 24 can determine the specific data that is to be relayed and shared with others within the network. The sharing of information among users 24 in the network 15 provides for the comparison of specific vehicle usage data to other users 24. Further, the vehicle monitoring capabilities provide users 24 the ability to track other users 24 and vehicles within the network 15.

The network includes a web portal 22 that collects information from the various vehicles 10 and provides an easy to use and friendly reporting and alert scheme along with real time monitoring of vehicles 10 included in the network 15. Information can be shared openly with other users to provide a comparison of environmental impact while providing information as to the location of specific drivers of vehicles 10 belonging to the network 15. Accordingly the example network and system 15 utilizes the telematic device 18 that records and transmits data indicative of a vehicle operation to a central web portal 22 for sharing among a network of users that are interested in monitoring and comparing vehicle usage to maintain connectivity along with providing a means of tracking and comparing energy usage for each driver and vehicle 10 in a way that encourages conservation.

The example network system 15 includes the plurality of vehicles 12 that each includes the telematic device 18 that receives information from a controller 14 of that vehicle 10. The controller 14 receives information from a plurality of data monitoring or sensing devices indicated at 16 disposed within the vehicle 10.

As appreciated, the monitoring devices 16 can include any monitors or sensors that are currently utilized and known in the art to monitor vehicle operating performance functions. Such monitoring devices could include sensors such as accelerometers, gyroscopes, and/or an electronic compass that indicates vehicle direction, other sensors that provide information indicative of engine operations such as engine speed sensor, oil pressure, and other data that are relevant and indicative of the overall health and operational capabilities of the vehicle 10 could also relay information to the controller 14 for subsequent transmission by the telematic device 18.

Data gathered from each vehicle 10 could be utilized to provide and determine a vehicle's overall health and to provide an alert when specific maintenance on component parts or overall vehicle checkups are required and desirable to improve vehicle performance and maintain desired level of efficiency. The information that is communicated relative to each of the vehicles 10 can be used as in a comparative manner in view of operation of other vehicles to encourage conservation. The information publicized regarding vehicle operation provided by this system 15 can also provide for the communication of the real time location of each vehicle 10. For example, the real time location of one of the vehicles 10 provides the ability for a parent to monitor a location of children driving the family car. Further, the location feature may be useful between friends to direct others to specific locations in the event that navigational help is desired.

Accordingly, the example system 15 provides a network that includes a plurality of vehicles 12 along with a plurality of users 24 that are interrelated and interconnected such that vehicle operation, location and usage can all be shared with other select users within the network.

The example system 15 includes the web portal 22 that includes a processor that receives information through the wireless network 20 from the various telematic devices 18. The telematic devices 18 are appliances installed within each of the vehicles that can transmit information related to vehicle operation gathered by the controllers 14 from the various sensors 16. The specific transmission frequency and content for each telematic device 18 may be individually tailored for each vehicle 10. The example telematic device 18 is installable into an On Board diagnostics (OBD) port on the vehicle. The OBD port is present within vehicles to provide a location where vehicle information stored and present in the vehicle controller can be accessed for diagnostics and maintenance purposes. The vehicle controller 14 could be a stand alone controller or part of the overall vehicle controller 14. Moreover, the controller 14 may include a memory device for storing information gathered indicative of vehicle operation.

Figure 2:
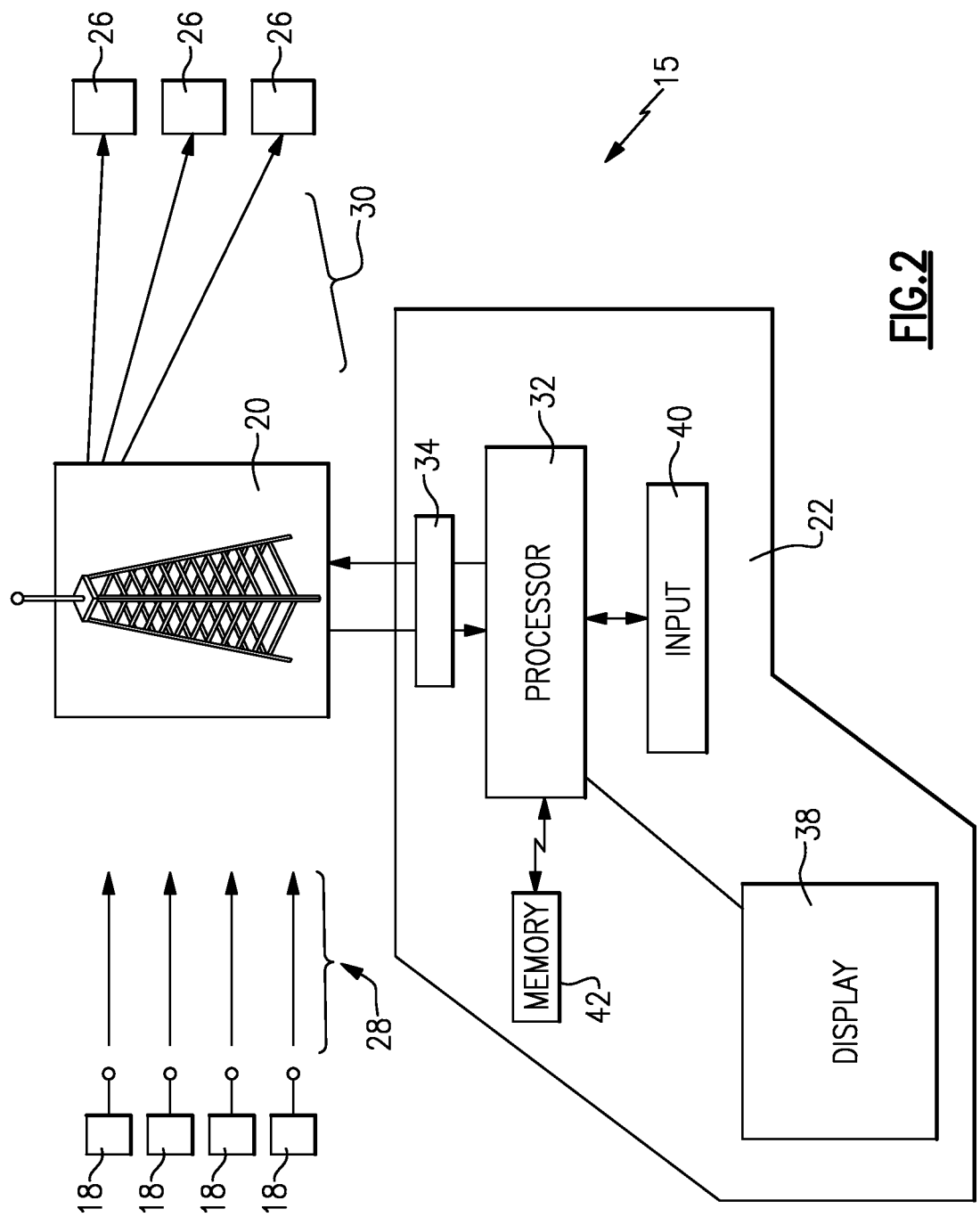
FIG. 2 is a schematic view of an example web portal for monitoring and managing vehicle usage.

Referring to FIG. 2 with continued reference to FIG. 1, the example web portal 22 operates to provide for the enrollment of one or more vehicles so that data gathered and transmitted by the telematic devices 18 can be monitored by accessing the web portal 22. The scope of the monitoring of each of the vehicles may be authorized at different levels for each vehicle 10 and tailored by each user 24. Accordingly each user 24 can determine the amount information that is shared openly with other users within the network 15. Furthermore, each user can tailor the amount of information gathered and the types of reports that are generated for each of the specific vehicles 10. Each of the users 24 could also identify other users with access to the web portal 22 that are authorized to receive information concerning their vehicle's operation and location.

The example web portal 22 is present on a processor or server 32 as is known and is accessible through the use of an input device such as the example keyboard 40. Further access to the web portal 22 can be executed with wireless communication devices such as cellular phones and portable computing devices. The web portal includes a first portion 34 that provides for the receipt and transmission of information over the network 20. The communication provided by the first portion 34 at the instruction of the processor 32 allows for transmission and receipt of information from the plurality of vehicles 10 and authorized portable communication devices 26 that are carried by users 24. Transmissions 30 to the portable communication devices 26 may provide alerts, emails notifications or other information that would alert a user 24 in the network 15 to specific vehicle operation parameters or location. The content of the alerts can include any information communicated to the web portal 22 such as the location of the vehicle 10. The information can also include alerts triggered responsive to specific vehicle operations, such when a vehicle exceeds a certain speed or enters or leaves a defined geographic area. The alerts could also provide a prompting to schedule and perform needed maintenance on the vehicle.

A user 24 could also choose to participate in a mobility monitoring feature of the network 15 to publicize the movement on a public automatic vehicle location mapping service (PAVLS). The PAVLS provides a location of a vehicle 10 so that users 24 enrolled in the vehicle community network 15 could see the location in real time of a vehicle within the network 15. For, example a daughter or son could allow access to parents so that the parents could track the location of the son/daughter when returning home during a trip away from home. The mobility monitoring feature of the network 15 could also provide tracking of new drivers as they begin driving so that parents would have an indication that the new drivers are staying within defined boundaries as they learn to operate a vehicle safely. Furthermore, the PAVLS could also be utilized for providing directions between friends to guide each other to locations that they are not familiar with such as out of town events or other destinations.

In conjunction with the PAVLS that publicizes vehicle location to the entire community, this system 15 also recognizes instances where privacy is desired and therefore a stealth mode is included to block communication of vehicle position. The stealth mode is implemented by a user to turn off the PAVLS feature to ensure privacy of the vehicle use. The stealth mode can be engaged by using a portable communication device 26 such as a telephone including text capabilities by way of a text or email message. Moreover, other actuation methods could also be utilized such as dialing a number and providing verbal prompts or commands to prevent communication of vehicle location. Moreover, the web portal 22 can be accessed to adjust user and/or vehicle specific authorizations regarding any of the monitoring a publicizing features in response to a specific code or password.

The example web portal 22 includes a memory portion 42 that provides for the storage of data from the various vehicles 10. The memory portion 42 can be implemented in hardware or software as is known. Moreover, the data stored in the memory portion 42 could be encrypted to prevent unauthorized access and viewing.

The example web portal 22 includes a display device 38. The example display device 38 represents not only a physical display such as a computer monitor, but also the formatting and layout provided as part of the web portal 22 to the various users 24. The display device 38 is provided to summarize, tabulate and visually format data to ease use and present the data in a friendly, accessible and meaningful way. Accordingly, the means and specific methods of displaying data indicative of vehicle operation and location can be modified and tailored to conform to user specific desires and preferences. Moreover, some of the data can be presented in a manner that maintains commonality across all vehicles 10 within the network 15 to provide for desired comparisons.

The web portal 22 displays information to communicate the gathered data indicative of vehicle operation. Data compiled and indicative of vehicle usage provides a means for improving efficiency of vehicle operations. A user may not understand the impact that average minutes driving in a certain speed or in a certain location have on efficiency and energy usage. Additionally, the most frequent time of the day or week that a user operates the vehicle may also provide insight that can be utilized to improve vehicle operation and energy usage. Once gathered and accessible by the web portal 22, this information is organized in a way that compares that information to others in the community to provide a peer review and also to gain understanding of vehicle usage so that vehicle usage can be more efficiently undertaken.

Figure 3:
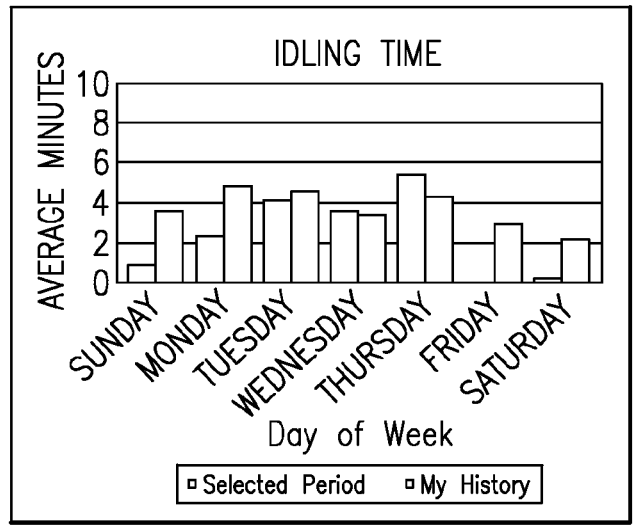
FIG. 3 is an example display for communicating information gathered on specific vehicle usage.

Referring to FIG. 3, an example histogram 44 includes information related to vehicle idling time for specific days during the week. As appreciated, idling a vehicle can be inefficient as it is consuming gas without the vehicle moving. Accordingly, the graph 44 of idling time for each day of the week can be utilized to alter routes or otherwise alter driving habits to minimize the idling time and thereby improve energy usage.

Figure 4:
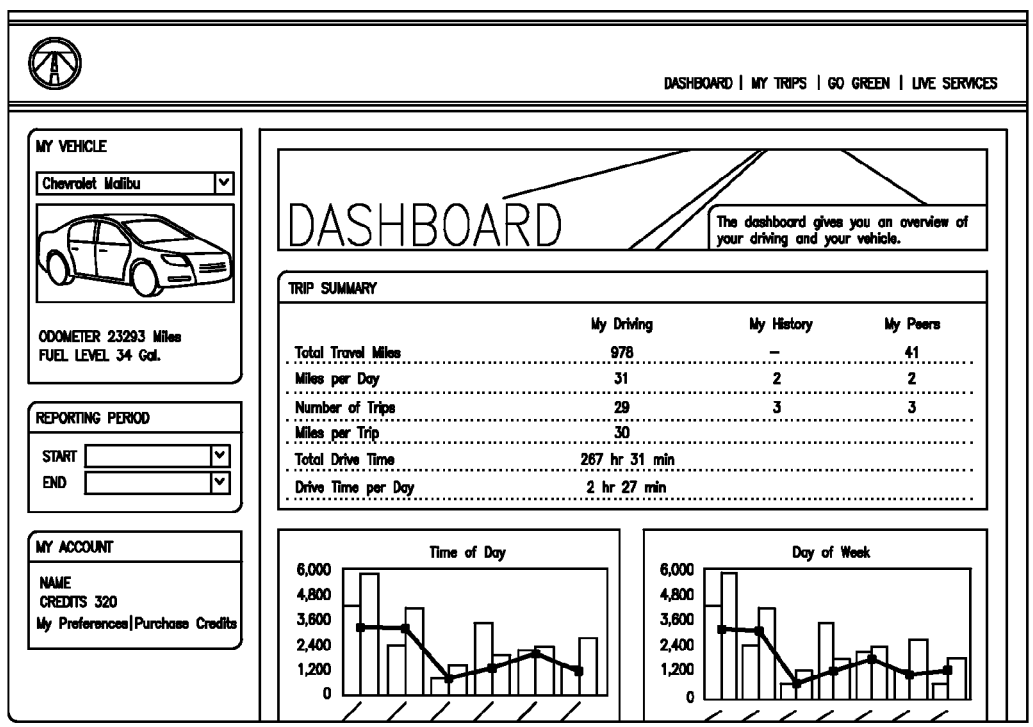
FIG. 4 is an example display communicating information indicative of vehicle usage to users of the web portal.

Referring to FIG. 4, an example trip summary display 46 viewable as part of the web portal 22 provides information that summarizes various parameters such as total miles traveled, miles per day, the number of individual trips and the miles per trip. This information can be utilized to analyze driving habits and therefore provide means of tracking vehicle usage and of altering driving habits to further reduce energy usage.

Figure 5:
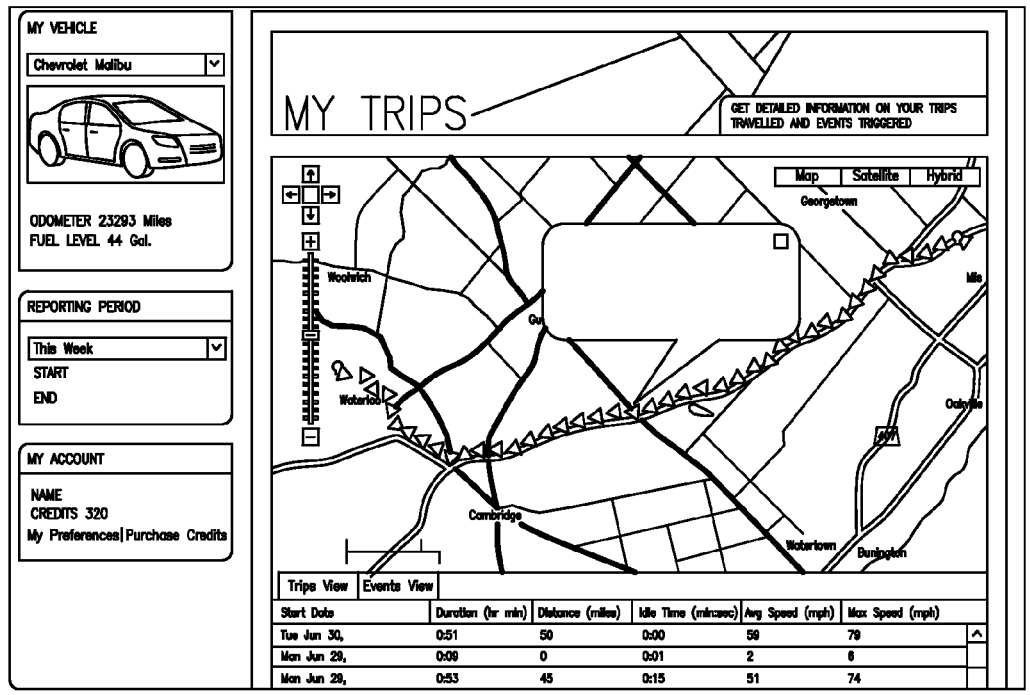
FIG. 5 is an example display providing a real time location for a vehicle.

Referring to FIG. 5, an example map 48 is shown that displays an example real time tracking of vehicle position. As appreciated, the specific illustration is of a trip between cites. The vehicle position is indicated along the route driven and is available to those authorized by the web portal 22 and the user 24. The user 24 can choose to publish this information among all the users that have authorized access to the web portal or can limit access to only a few selected users. This mobility monitoring feature can have several benefits in that it can be utilized to track younger drivers as they learn to drive and/or it can be utilized to track numerous individuals as they congregate to a specific destination. Alternatively, each user can initiate a stealth mode where the tracking feature would be switched off to allow privacy such that the entire user community is not able to track operation and location of the vehicle.

Figure 6:
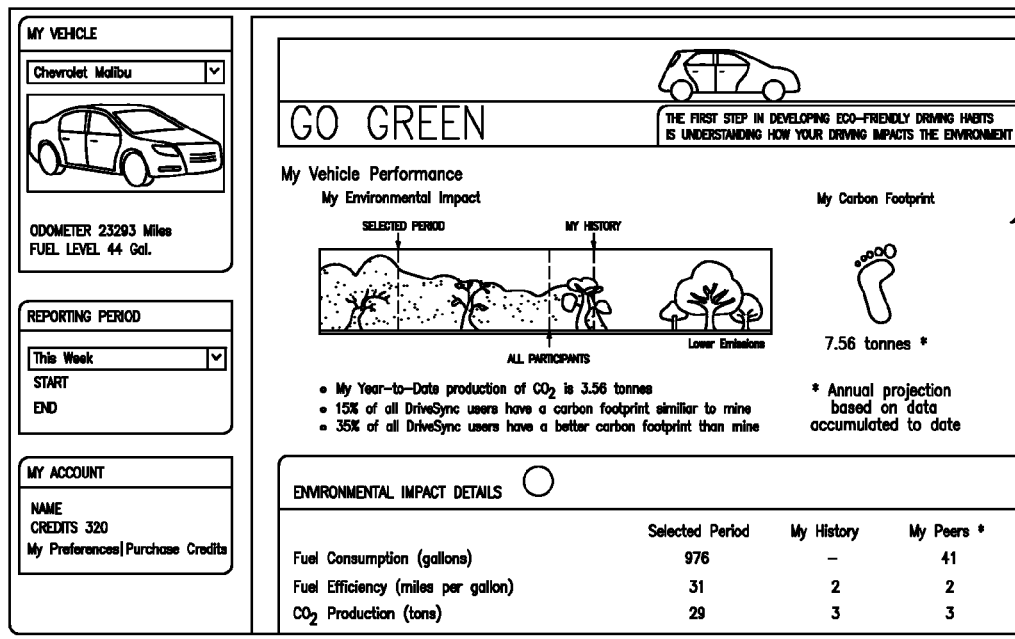
FIG. 6 is a display illustrating information indicative of environmental impact due to vehicle usage.

Referring to FIG. 6, another formatted display indicated at 50 visually represents data determined utilizing gathered vehicle information indicative of vehicle usage to determine a level of environmental impact by each of the vehicles 10 and/or each of the individual users 24. In this example, vehicle operation is indicated by the amount of $CO_2$ that is produced. The level of $CO_2$ produced is determined by information transmitted from each of the vehicles 10 and is utilized to quantify a vehicle and/or drivers environmental impact and present in a friendly meaningful way this information to encourage efficient energy use and conservation.

Moreover, the system 15 can track energy use related to vehicle operation such to generate a database that could be utilized for implementing a carbon exchange program that rewards efficient users for fewer emissions while taxing those that have higher emission requirements. In such an exchange, it is envisioned where users are allotted a specific emission allowance. Users who exceed allotted carbon dioxide emissions as a result of energy use could incur a fee. Those that remained under their allowance would be rewarded by being able to sell the excess capacity to those that had exceeded their allowances. As appreciated, such a program could be implemented on a voluntary basis to encourage members of the network 15 to conserve and improve energy efficiency.

Moreover, a carbon credit exchange could be utilized if registered buyers register their intent to buy carbon credits of sellers to sell their carbon credits. Users who require more energy use than allotted could purchase additional credits from those that do not have such a need. Such an exchange could encourage reduction of energy usage and improvement in vehicle operation efficiencies. As appreciated, the example web portal 15 can utilize the data gathering capability from the various telematic devices 18 for determining usage of an individual consumer that could then be utilized for encouraging the efficient use of energy and for the reduction in environmental impact.

Figure 7:
FIG. 7 is another display provided by the web portal utilized to summarize information indicative of vehicle usage.
Figure 7:
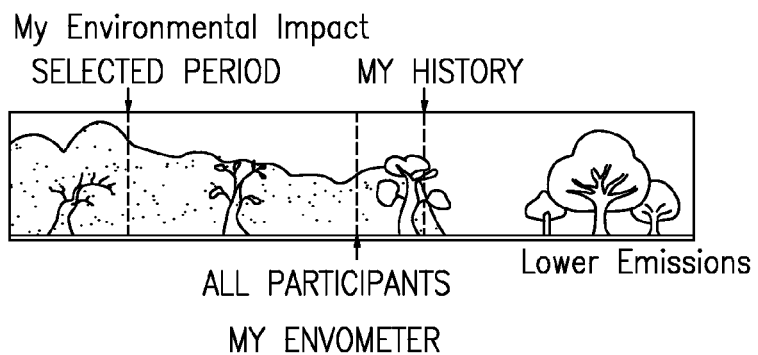

Referring to FIG. 7, another formatted display indicated at 52, displays the user's specific impact on the environment as reflected by vehicle usage. This information is determined based on the data transmitted from the vehicle 10 by way of the telematic device 18 to the web portal 22. The data from each vehicle 10 would include miles driven along with parameters indicative of engine operation that are utilized to calculate specific consumption and efficiency numbers such as carbon dioxide production along with fuel consumption. These amounts and determinations may then be utilized to determine an overall carbon footprint of a specific individual or vehicle. This carbon foot print could then be utilized as a means of gauging the efforts for reducing energy consumption and on the impact that each individual has on their surrounding environment.

Accordingly, the disclosed system 15 and web portal 22 acquires, compiles and formats information on vehicle usage across a vehicle community. The vehicle community is comprised of a plurality of vehicles whose users and owners have signed onto the web portal to allow gathering and accumulation of vehicle operation information for various uses including maintaining a record of vehicle operation so that routine maintenance can be timely done. Moreover, the example system 15 and web portal 22 provides for monitoring of vehicle usage and position that may be utilized by individuals in tracking vehicle location. The example system 15 and web portal 22 further provides a central location for determining energy usage and the resulting impact on the environment to provide a measure for possible improvements and conservation.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A method of managing vehicle usage comprising the steps of:
   gathering data indicative of vehicle operations from monitoring devices installed within a plurality of vehicles;
   transmitting the gathered data indicative of vehicle operations with a telematic device installed within each of the plurality of vehicles;
   defining a portal accessible on a wide area network by users authorized to receive the gathered data, wherein the users includes users within the plurality of vehicles;
   receiving the gathered data indicative of vehicle operations on the wide area network according to defined parameters on a device capable of accessing the wide area network;
   sharing data indicative of vehicle operations with the users within the plurality of vehicles authorized to receive the gathered data across a vehicle community including a plurality of vehicles and a plurality of users authorized to receive information relating to at least some of the plurality of vehicles in real time from within each of the plurality of vehicles; and
   selectively blocking access to information relating to vehicle position by a vehicle operator.

2. The method as recited in claim 1, wherein at least some of the gathered data indicative of vehicle operations is received and accessible in real time.

3. The method as recited in claim 1, including generating one of an alert and report based on selected portions of the data gathered indicative of vehicle operations and forwarding the one of the alert and report to at one of the users authorized to receive information relating to at least some of the plurality of vehicles.

4. The method as recited in claim 1, wherein the data gathered indicative of vehicle operations includes a position of at least one vehicle available to the authorized users in real time.

5. The method as recited in claim 1, including processing the gathered information to quantify one of a vehicle and a user's energy usage.

6. The method as recited in claim 5, including generating a comparison of a plurality of users energy usage.

7. The method as recited in claim 5, including quantifying the user's energy usage as compared to an energy usage allowance.

8. A system for managing usage information of a plurality of vehicles among a plurality of users comprising:
   a telematic device mounted within each of a plurality of vehicles, the telematic device capable of transmitting information gathered by monitoring devices within each of the plurality of vehicles over a wireless communication network; and
   a portal defined for access by a plurality of users within a corresponding one of the plurality of vehicles on a wide area network, the portal for receiving at least a portion of the gathered information transmitted by the telematic device from each of the plurality of vehicles and arranging the gathered information for sharing in real time with the plurality of users, wherein the portal includes a portion for quantifying energy usages of each of the plurality of vehicles and each of the plurality of users for communicating energy usage of all of the plurality of vehicle as compared to any one of the plurality of vehicles, and a portion for receiving instructions from each of the plurality of users for restricting access to data gathered by the portal from each of the plurality of vehicles.

9. The system as recited in claim 8, wherein the portal includes a portion that transmits information received from one of the plurality of vehicles to authorized portable communications devices.

10. The system as recited in claim 8, wherein the gathered information includes a current position of a vehicle that is communicated in real time to the plurality of users responsive to authorization provided by a specific one of the plurality of users.

11. The system as recited in claim 8, wherein the portal comprises a compilation of information accessible by a plurality of authorized users through a computing device.

12. A system for managing information pertaining to a plurality of vehicles the system comprising:
   a portal web site connected to a plurality of telematic devices mounted within a corresponding plurality of vehicles through a computer based network, said portal web site including:
   a receiving portion for receiving information relating to vehicle operation from the plurality of telematic devices;
   a data storage portion for storing the information relating to vehicle operation;
   a processing portion for formatting information relating to selected vehicle operating parameters; and
   a transmitting portion for sharing information relating to the selected vehicle operating parameters to at least some of a plurality of authorized users within a corresponding one of the plurality of vehicles in real time, wherein each of a plurality of users restricts information transmitted from the ones of the plurality of vehicles under one of the plurality of users control to the portal web site that are available for viewing by others of the plurality of users.

13. The system as recited in claim 12, wherein the processing portion includes a portion for formatting information relating to selected vehicle operating parameters indicative of energy usage.

14. The system as recited in claim 12, wherein the transmitting portion includes a portion for transmitting position information of at least some of the plurality of vehicles to portable communications devices authorized by the plurality of users.

15. The system as recited in claim 12, wherein the transmitting portion includes a portion for transmitting information relating to vehicle operation to the plurality of users in real time.

* * * * *

UNITED STATES PATENT AND TRADEMARK OFFICE
CERTIFICATE OF CORRECTION

| | | |
|---|---|---|
| PATENT NO. | : 9,092,919 B2 | Page 1 of 1 |
| APPLICATION NO. | : 12/914047 | |
| DATED | : July 28, 2015 | |
| INVENTOR(S) | : Otman A. Basir | |

It is certified that error appears in the above-identified patent and that said Letters Patent is hereby corrected as shown below:

IN THE CLAIMS:

In claim 3, column 6, line 61; after "at" insert --least--

In claim 8, column 7, line 26; "vehicle" should read as --vehicles--

In claim 12, column 8, line 5; immediately after "vehicles" insert --,--

Signed and Sealed this
First Day of December, 2015

Michelle K. Lee
*Director of the United States Patent and Trademark Office*